Nov. 23, 1943.   E. H. COREY   2,335,173
MEANS FOR VENTILATING POULTRY AND THE LIKE BATTERY HOUSES
Filed Sept. 29, 1941   2 Sheets-Sheet 2

INVENTOR:
Emmett H. Corey
BY Harry R. Canfield
ATTORNEY.

Patented Nov. 23, 1943

2,335,173

UNITED STATES PATENT OFFICE 2,335,173

MEANS FOR VENTILATING POULTRY AND THE LIKE BATTERY HOUSES

Emmett H. Corey, Rocky River, Ohio

Application September 29, 1941, Serial No. 412,792

2 Claims. (Cl. 119—21)

This invention relates to the ventilation of housing structures for poultry and animals.

Perhaps the most important field of use of this invention is in the housing or confining of poultry during the growing, developing, and egg-laying periods thereof; and for simplification of description it will be described herein as applied to that use, although as will become apparent hereinafter it is applicable to the housing and confining of other fowls such as game birds, etc., and of animals such as rabbits, guinea pigs, etc., when produced in quantities for commercial purposes.

According to the more recent practice, poultry is housed in so-called battery houses, illustrative of which is the battery egg-laying house, in which each hen is confined to a small cell or nest. These cells are open to the surrounding atmosphere to supply air to the hens, and a great number of such cells, each accommodating one hen, are customarily housed in a room or house for weather protection, the cells being compactly arranged in layers or tiers or batteries.

There is thus a dense poultry population in a single, enclosed, relatively small room or house, which has advantages of practical economy; but it also has the serious objection that the emanations given off by the excrement and by the bodies and breath of the numerous fowls, accumulate in the enclosing room or house, and the odor or stench thereof becomes disgusting and intolerable to visitors or attendants.

To avoid such odor by ventilation is of course an obvious expedient, but to ventilate merely by introducing outside air into the battery house has not proved a satisfactory solution of this difficulty, because it merely dilutes the odorous emanations unless it is supplied in such volume as to make heating of the air a serious expense particularly in the northern climates where eggs are produced in large quantities.

Also in many instance it is desirable to locate the battery house in a residence district of a city, and the odor from the house when it merely escapes to the outside air, becomes a neighborhood nuisance.

It is the primary object of the present invention therefore to provide an improved ventilating system for battery houses of the class referred to by which the hens (or animals) confined therein will be supplied with fresh air, and the odors emanating from them will be carried off with the minimum of volume of air supply.

Another object is to provide such a ventilating system as that described by which fresh air may be supplied to the battery cells, and the foul, contaminated, odorous air may be conducted away from them by conduits and de-odorized before discharging it into the atmosphere.

Another object is to provide a house or room structure containing a battery of cells as hereinbefore referred to and arranged so that during the process of ventilating the same for the purposes described the heat given off by the bodies of the hens (or animals) may be recovered and utilized to assist in heating the interior of the house or room thereby effecting an economy in the heating thereof in cold weather.

Other objects will be apparent to those skilled in the art to which my invention appertains.

My invention is set forth hereinafter in the appended claims; but the particular embodiment thereof which is illustrated and described comprises a room or house in which a battery of fowl or animal cells is housed, the room or house being substantially air-tight, and into which air is inducted by a fan or blower. The air in the room flows into and through each individual cell and out through an aperture or apertures in the back wall of the cell, an exhaust conduit system being connected to these apertures to conduct the foul air out of the room. The air in the room or house may, for greater efficiency, be at slightly super-atmospheric pressure. The incoming air may be conditioned and the outgoing air may be purified or deodorized by suitable apparatus. In cold weather the exhaust conduit system is controlled to transfer the heat given off by the fowls or animals in the cells, from the exhaust air to the air in the room, to save expense in heating the room or incoming air.

My invention is fully disclosed in the following description taken in connection with the accompanying drawings in which, Fig. 1 is a cross-sectional view of a battery house embodying my invention and illustrating in connection therewith, apparatus for supplying ventilating air to the house and withdrawing it therefrom, the view being in some respects diagrammatic;

Fig. 5 is a view illustrating an air duct adjustment which I may employ.

Figure 1:
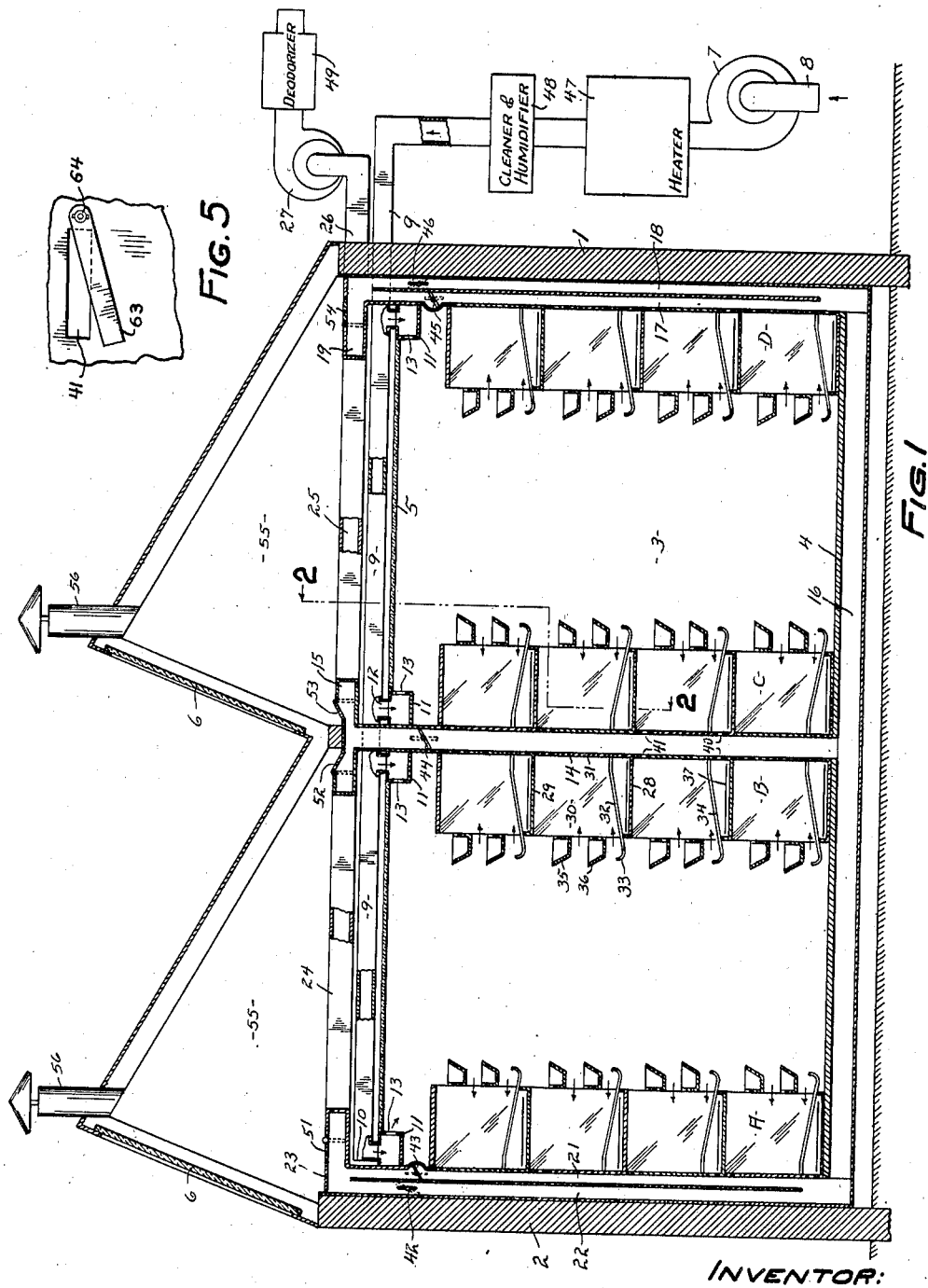
Figure 2:
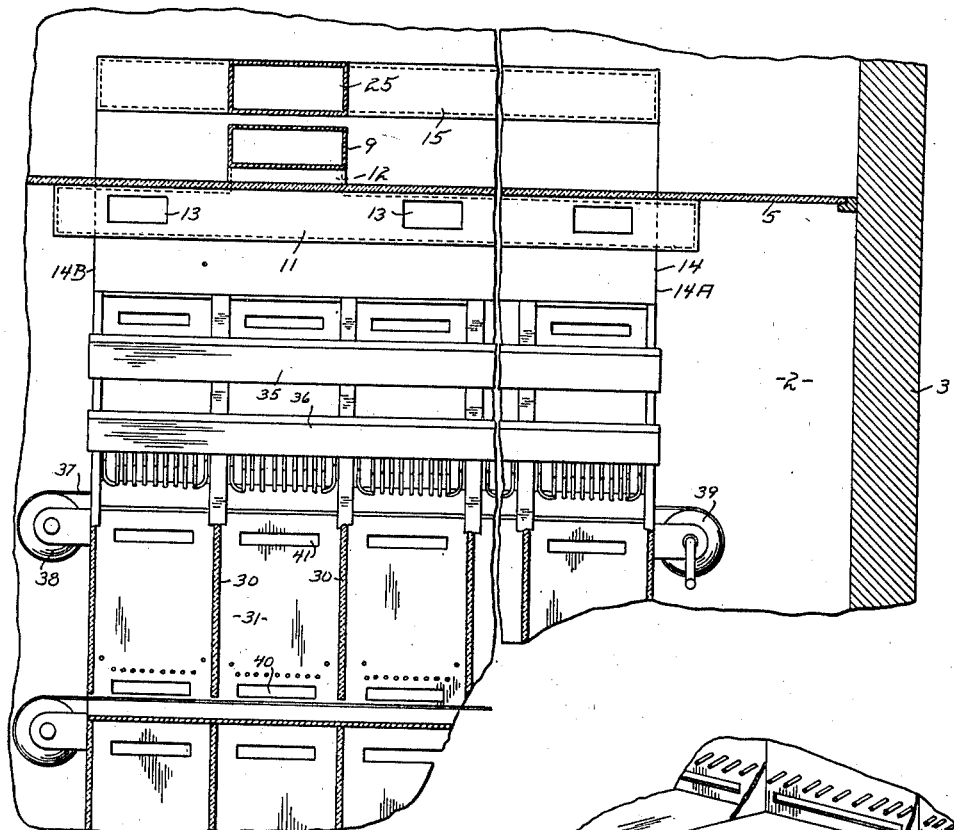
Fig. 2 is a fragmentary sectional view taken from the plane 2—2 of Fig. 1.
Figures 3, 4:
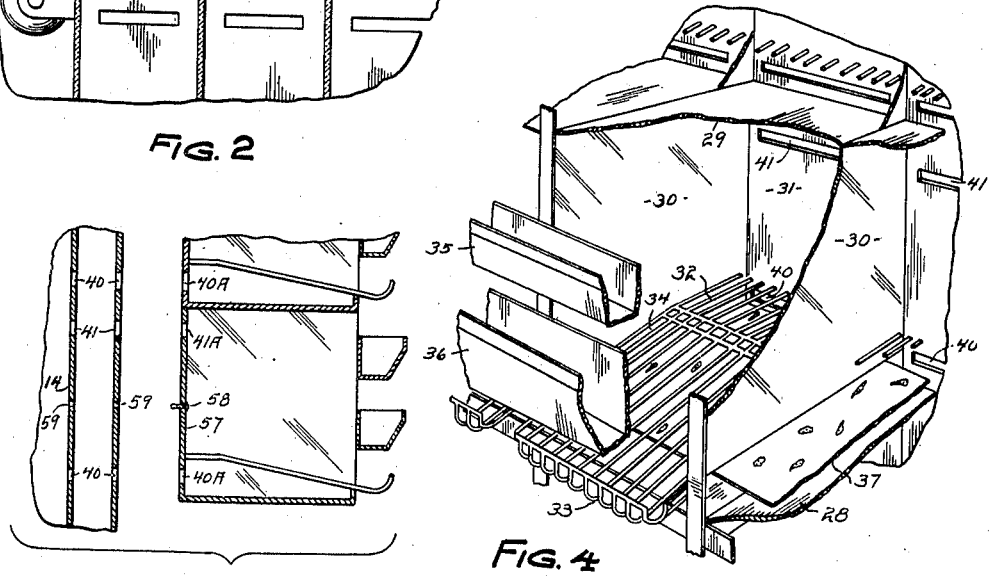
Fig. 3 is a fragmentary view illustrating certain details of the structure of the house and the structure of the cells shown in Fig. 1; and the view may be taken as illustrating a modification of the form shown in Figs. 1, 2, and 4.
Fig. 4 is a perspective view illustrating one of the cells of the battery house of Fig. 1.

Referring to the drawings, Figs. 1, 2, and 4, I have shown at 1 and 2 the side walls of a house and at 3 one of the end walls and at 4 a floor. Except for particularities to be pointed out, the walls and floor may be constructed and supported in any usual or preferred manner, the same constituting no essential part of the invention.

A ceiling 5 is provided in the house which preferably is of glass as shown.

The roof of the building is preferably of the saw-tooth type with glass 6 in the southern or steeper steps of the roof.

The walls and ceiling referred to are air-tight or substantially so, and the necessary door to give entrance to the building (and not shown) will preferably be made so that when it is closed it also is air-tight.

Air is supplied to the interior of the house by ventilating apparatus which conveniently may be housed in an annex but which has been shown diagrammatically in Fig. 1. It comprises an air fan or blower 7 having an air intake at 8 and supplying air to a conduit 9.

The conduit 9 passes through the side wall 1 of the building in sealed relation thereto, and extends entirely across the building, above the glass ceiling 5, being closed at its terminus as at 10.

This transverse duct 9 communicates with longitudinal ducts 11—11 running lengthwise of the building and preferably at an overhead elevation, for example immediately under the glass ceiling 5, as shown in the drawings, the communication between these ducts and the duct 9 being shown at 12 for one of them.

At spaced points along the ducts 11, they have outlet openings 13—13 opening into the interior of the house.

In the middle of the house is a vertical duct 14 which, longitudinally of the house, extends almost to each of the end walls 3, the longitudinal terminations of this duct being indicated at 14A and 14B in Fig. 2. The upper end of this duct passes through the ceiling 5 and into a header 15. In this connection it may be noted that the duct 9 referred to above passes through the vertical duct 14 in sealed relation thereto as will be apparent from the drawings.

The lower end of the duct 14 opens into a transverse duct 16 under the floor 4, extending transversely from side to side of the house and having any suitable dimension longitudinally of the house.

On the inside of the wall 1 is a pair of vertical ducts 17 and 18 communicating at their lower ends with the duct 16, and at their upper ends with a header 19.

Inside of the wall 2 is a similar pair of vertical ducts 21 and 22, communicating at their lower ends with the duct 16 and at their upper ends with a header 23.

The ducts 16, 17, 18, 21, and 22 may all extend longitudinally of the building as far as may be desired, a suitable extent being the same as that of the central vertical duct 14.

The headers 23 and 15 are connected by a duct 24 and the headers 15 and 19 by a duct 25 and the header 19 is connected by a duct 26 extending sealedly through the wall of the building to an exhaust fan or blower 27.

The individual cells of the battery house may be constructed integrally with or permanently attached to the building structure at the time that it is erected; or they may be separately built and installed in the building after the above-described system of ducts has been constructed.

In this respect, Fig. 1 is somewhat diagrammatic illustrating a generalized embodiment of the invention, the details of construction of the ducts as well as the cells now to be described, not being shown, inasmuch as they constitute no essential part of the present invention. The ducts as well as the cells may be made from various materials supported on suitable frames as will be well understood by those in this art.

There are four batteries of cells in the building of Fig. 1 each battery comprising four tiers of cells and as many cells in each tier as can be accommodated by the length of the building and corresponding to the over-all width of the vertical duct system, which longitudinal width as referred to above is indicated by the distance between the longitudinal terminations 14A and 14B of the central duct, this being preferred because it leaves a space between the longitudinal termination of the duct system and the end walls as shown in Fig. 2 to permit attendants to walk around the ends of the tiers.

The lowermost tiers of the cells are represented by the letters A, B, C, D, and are supported on the floor 4, the row of cells in the tier A being backed against the wall of the duct 21; the cells of the tier B being backed against one wall of the duct 14; the cells of the tier C being backed up against the other wall of the duct 14; and the cells of the tier D being backed up against the wall of the duct 17. The cells of the other tiers rest one upon the other above the ones just described as indicated in Figs. 1 and 2.

In the following, reference may be had to Fig. 4 as well as Figs. 1 and 2, Fig. 4 showing a single cell in more complete detail with parts broken away.

The front of each cell is open to the air in the room but the top, bottom, and side walls of each cell are preferably solid, the back wall obviously being solid also inasmuch as it is constituted by the wall of the corresponding duct.

It is thought that a description of one cell will serve for all of the others. The bottom wall is shown at 28, the top wall at 29, the side walls at 30—30 and the back wall at 31 which as stated may be the duct wall.

The hen (or animal) stands upon an openwork false bottom 32 which at its forward portion as at 34 is inclined downwardly terminating forwardly of the cell as at 33 in a trough-like arrangement for receiving eggs which roll down the incline 34.

Food and water troughs 35 and 36 are supported across the front of the cell accessible to the hen in the cell.

Under the false bottom 32 and resting upon the bottom 28 may be provided a pan or the like (not shown) for receiving droppings but I prefer to employ the well-known belt conveyor for this purpose the same being shown at 37.

The belt 37 may be of paper or the like wound on a supply roll 38, see Fig. 2, and wound up on a drum 39 to convey the droppings longitudinally out from the cells for collection thereof in the well-known manner.

Obviously the bottom 28 of one cell may be the top wall of the next cell below it throughout the system.

An aperture 40 is provided through the back wall or duct wall as the case may be communicating with the interior of the duct, this opening being located below the false bottom 32 and above the bottom 28, whereby it is located just above the level of excrements or droppings on the bottom or on the conveyor belt; and a similar aperture 41 is provided located at a point near the upper wall 29. These openings 40 and 41 may extend longitudinally substantially the longitudinal extent of the cell, and a like pair of openings is provided for each cell of the system, each pair of openings communicating between the cell and the corresponding duct at the back of the cell.

Provision is made to operate the system differently in cold weather from that in hot weather, this being under the control of valves 42 to 46 respectively in the upper portions of the ducts 22, 21, 14, 17, and 18 respectively to which reference will be made. These valves are shown in solid line in the cold weather positions.

In the operation of the above-described construction, the only inlet for air to the room containing the cells is by way of the duct 9 from the blower or fan 7 and the only outlet is by way of the duct 26.

Air enters the construction through the duct 9 and flows into the headers 11—11 and out therefrom by the openings 13—13 into the room; and, there being no other outlet, it must flow through the cells and through the openings 40 and 41 into the vertical ducts 17, 14 and 21. The valves 43, 44, and 45 being closed the air in these vertical ducts flows downwardly. The air flowing downwardly in duct 17 enters duct 18 and flows upwardly; similarly the air in duct 21 flows upwardly in duct 22; the air from duct 14 flows downwardly to duct 16 and there divides flowing part toward the right and part toward the left (as viewed in Fig. 1) joining the air in ducts 18 and 22. The valves 42 and 46 being open the air thus flows into headers 23 and 19, which are connected to each other by ducts 24 and 25; and thence the air flows outwardly by the duct 26.

The blower 7 supplies the air at pressure to the duct 9 and there will correspondingly be a drop of pressure in the system from the duct 9 to the duct 26 due to the various restrictions to the flow; and it is here emphasized as one of the particular features of this invention that the drop of pressure over this path of flow produces superatmospheric pressure in the air-tight room. This pressure is preferably only slightly above atmospheric pressure for physiological or biological reasons and is preferably controlled by the size of the openings 40 and 41 leading from the cells into the ducts. The purpose of this pressure is to cause air within the room to flow into the open front of every one of the cells and through the cells and out into the ducts by way of the openings 40 and 41.

This is preferably accomplished by providing an ample supply of air into the room from the duct 9, and by a restricted flow out of the room by the openings 40 and 41. In some cases, all of the openings 40 and 41 will be of the same size; but in order to control the rate of flow through these openings to make the flow rate through all of the cells uniform, or, if desired, to vary it with respect to some of the cells, the size of the openings 40—41 can be made adjustable by the arrangement in Fig. 5, comprising a pivoted gate 63 for covering more or less of the opening and securable in any adjusted position by the wing nut 64 at the pivot bolt.

The air flowing into the front of the cell and out at the upper opening 41 flows gently past and over the hen supplying her with fresh air and carrying emanations from the hen; and the air flowing into the front of the cell and out at the lower opening 40 flows directly over the excrements on the bottom of the cell or on the belt conveyor as the case may be. There results a continuous, gentle flow of air into each of the cells, equally, if desired, and out at the back of the cell, whereby none of the odor from the cell can find its way into the room.

The air flowing through the cells will be heated by the heat radiated from the bodies of the hens and exhaled in their breath, and this air flowing downwardly through the duct 14 and thence through the duct 16 under the floor transfers heat therefrom to the walls of the duct 14 and to the floor where it is radiated to the air in the room. Similarly the air flowing downwardly through the ducts 17 and 21 transfers heat to the inner wall of the duct and thence to the air in the room; and the air flowing upwardly through the ducts 22 and 18 transfers heat to the outer wall of the ducts 17 and 21 where it is radiated to the air in these ducts. Thus notwithstanding that the air flow is outwardly from the room, a part at least of the heat supplied thereto by the hens is conserved. As stated above the air flows gently or slowly and therefore is in contact with the heat-transferring walls referred to for a considerable period of time before leaving the structure whereby it is given time for the heat transfer to occur.

As shown diagrammatically in the right hand part of Fig. 1, the air supplied by the blower 7 may pass through a heater 47 and through a cleaner and/or humidifier 48 or other apparatus, to condition it before entering the building. The air in the conduit 26 may be expelled directly to atmosphere or it may be exhausted through a deodorizer 49 before being exhausted to the atmosphere. The blower 27 is placed in the line of conduit 26 to assist in the circulation of the air and also to reduce the drop of pressure beyond the openings 40 and 41 whereby their restriction of the air flow to produce pressure within the room will be more effective, but the blower 27 may in some cases not be needed. The rate of air flow through the cells, can be controlled by regulating the speeds of the blowers 7 and 27 as will be understood.

In the warm weather operation, the valves 42 and 46 will be moved to the closed or dotted line positions, and the valves 43, 44, and 45 will be moved to the dotted line open positions, so that the air in the conduits 21, 14, and 17 will flow upwardly and directly into the headers 23, 15, and 19 and thence out at the conduit 26.

As a further modification, whether in the summer or winter operation, valves 51, 52, 53, and 54 may be provided at the headers 23, 15, and 19 respectively and these may be thrown to their dotted line positions whereupon the exhaust air flowing to these headers will flow directly into the space 55—55 under the roof and thence out to atmosphere at ventilators 56—56.

The side walls of the individual cells are preferably made of solid material in order that the air will be directed to flow into the front of each cell, but if desired, and in order not to completely isolate each of the hens from her companions, the side walls 30—30 may be made of transparent material such as glass.

From the foregoing it will be apparent that the cells are in the nature of parallel outlet conduits communicating with a common outlet duct, and that a hen is positioned in each of the parallel outlet conduits.

As shown in Fig. 3, the ducts of the system such for example as the duct 14, may be constructed as a part of the building, and the cells may be constructed separately and attached to the duct walls. In Fig. 3 the duct 14 is shown to illustrate this principle. The duct is provided with pairs of lower and upper openings 40—41; and the cells have each a rear wall 57 provided with corresponding openings 40A and 41A; and the back wall 57 of the cell is mounted upon the wall of the duct 14 by screws or the like 58 projected through the back wall of the cell and threaded into corresponding holes 59 in the duct wall.

My invention is not limited to the exact details of construction illustrated and described nor to the exact arrangement of the parts thereof. Changes and modifications may be made and my invention contemplates the inclusion of all such modifications and changes which come within the scope of the appended claims.

I claim:

1. A ventilated housing for hens, small animals and the like, comprising side walls and a floor wall and an overhead wall enclosing a substantially sealed interior; a plurality of cells each having top, bottom, side and back walls and open at the front and arranged in pairs of tiers with the open fronts of the cells of one tier of the pair confronting those of the other; passageways between the pairs of tiers and along the open fronts of the cells and under the overhead wall through which attendants may walk to serve the open fronts of the cells; the back wall of each cell having an aperture therethrough; the apertures of the cells of each tier all communicating with a vertical duct associated with that tier; an overhead air supply duct having air inlet orifices for introducing air into the passageways at upper portions of the passageways; the upper ends of the vertical ducts all communicating with an overhead outlet duct; means to supply air through the air supply duct and inlet orifices to the passageways under pressure therein, to cause the air to flow downwardly through the passageways and therein divide and flow from the passageways through all of the cells and their apertures to the vertical ducts and thence upwardly through the vertical ducts to the outlet duct; discharge ducts communicating with the vertical ducts at their lower ends and communicating with the outlet duct and disposed in heat-transferring relation to the air in the passageways; normally closed valve means normally closing the discharge ducts and operable to open them; and normally open valve means at the upper end portions of the said vertical ducts and operable to close them.

2. A ventilated housing for hens, small animals and the like, comprising side walls and a floor wall and an overhead wall enclosing a substantially sealed interior; a plurality of cells each having top, bottom, side and back walls and open at the front and arranged in a plurality of vertical tiers in the sealed interior; passageways along the open fronts of the cells of the tiers and under the overhead wall through which attendants may walk to serve the open fronts of the cells; the back wall of each cell having an aperture therethrough; the apertures of the cells of each tier all communicating with a vertical duct associated with that tier; an overhead air supply duct having air inlet orifices for introducing air into the passageways at upper portions of the passageways; the upper ends of the vertical ducts all communicating with an overhead outlet duct; means to supply air through the air supply duct and inlet orifices to the passageways under pressure therein, to cause the air to flow downwardly through the passageways and therein divide and flow from the passageways through all of the cells and their apertures to the vertical ducts and thence upwardly through the vertical ducts to the outlet duct; discharge ducts communicating with the vertical ducts at their lower ends and communicating with the outlet duct and disposed in heat-transferring relation to the air in the passageways; normally closed valve means normally closing the discharge ducts and operable to open them; and normally open valve means at the upper end portions of the said vertical ducts and operable to close them.

EMMETT H. COREY.